US011254815B2

(12) United States Patent
Rapthel et al.

(10) Patent No.: US 11,254,815 B2
(45) Date of Patent: Feb. 22, 2022

(54) POLYOLEFIN POLYLACTIC ACID POLYMER BLENDS

(71) Applicant: BYK-Chemie GmbH, Wesel (DE)

(72) Inventors: Inno Rapthel, Wesel (DE); Frederik Piestert, Wesel (DE); Andre Rapthel, Wesel (DE); Thorsten Kröller, Wesel (DE)

(73) Assignee: BYK-CHEMIE GMBH, Wesel (DE)

( * ) Notice: Subject to any disclaimer, the term of this patent is extended or adjusted under 35 U.S.C. 154(b) by 202 days.

(21) Appl. No.: 16/755,613

(22) PCT Filed: Oct. 11, 2018

(86) PCT No.: PCT/EP2018/077726
§ 371 (c)(1),
(2) Date: Apr. 13, 2020

(87) PCT Pub. No.: WO2019/076724
PCT Pub. Date: Apr. 25, 2019

(65) Prior Publication Data
US 2020/0332111 A1    Oct. 22, 2020

(30) Foreign Application Priority Data

Oct. 17, 2017    (EP) .................................... 17196811

(51) Int. Cl.
| | | |
|---|---|---|
| *C08L 67/04* | (2006.01) | |
| *C08L 23/06* | (2006.01) | |
| *C08L 23/08* | (2006.01) | |
| *C08L 23/12* | (2006.01) | |
| *C08L 23/14* | (2006.01) | |
| *C08L 51/06* | (2006.01) | |
| *C08L 51/08* | (2006.01) | |
| *B29C 48/00* | (2019.01) | |
| *B29C 45/00* | (2006.01) | |

(52) U.S. Cl.
CPC .......... *C08L 67/04* (2013.01); *B29C 45/0001* (2013.01); *B29C 48/023* (2019.02); *C08L 23/06* (2013.01); *C08L 23/08* (2013.01); *C08L 23/12* (2013.01); *C08L 23/14* (2013.01); *C08L 51/06* (2013.01); *C08L 51/08* (2013.01); *C08L 2205/02* (2013.01); *C08L 2205/03* (2013.01); *C08L 2205/22* (2013.01); *C08L 2310/00* (2013.01)

(58) Field of Classification Search
CPC .......... C08L 23/06; C08L 23/14; C08L 23/08; C08L 67/04; C08L 51/06; C08L 51/08
See application file for complete search history.

(56) References Cited

U.S. PATENT DOCUMENTS

| | | | |
|---|---|---|---|
| 8,211,966 B2 | 7/2012 | Hong et al. | |
| 9,249,268 B2 | 2/2016 | Li et al. | |
| 2008/0076880 A1 | 3/2008 | Nakagawa et al. | |
| 2010/0160564 A1 | 6/2010 | Kameo | |
| 2011/0257323 A1 | 10/2011 | Hong et al. | |
| 2014/0066565 A1 | 3/2014 | Jeong et al. | |

FOREIGN PATENT DOCUMENTS

| | | |
|---|---|---|
| JP | 2009-256487 A | 11/2009 |
| JP | 2017-519863 A | 7/2017 |
| KR | 10-2011-0116888 A | 10/2011 |
| KR | 102012044799 A | 5/2012 |

OTHER PUBLICATIONS

International Search Report and Written Opinion for International Application No. PCT/EP2018/077726 dated Dec. 13, 2018.
Nalin Ploypetchara et al., "Blend of polypropylene/poly(lactic acid) for medical packaging application: physicochemical, thermal, mechanical, and barrier properties," Energy Procedia 56 ( 2014 ) pp. 201-210.

*Primary Examiner* — Jeffrey C Mullis
(74) *Attorney, Agent, or Firm* — Fitch, Even, Tabin & Flannery LLP

(57) ABSTRACT

The invention relates to a process of preparing a polyolefin polylactic acid polymer blend comprising the steps of i) providing a polyolefin selected from polyethylene, polypropylene, and mixtures and copolymers thereof, ii) providing polylactic acid, iii) providing a polyolefin selected from polyethylene, polypropylene, and mixtures and copolymers thereof grafted with at least one epoxide-functional monomer, iv) providing a polylactic acid grafted with at least one carboxylic acid or carboxylic anhydride functional monomer, v) mixing the components i) to iv) at elevated temperature in a range from 150° C. to 260° C., and wherein component i) is provided in an amount of 5.0 to 50.0% by weight, component ii) is provided in an amount of 40.0 to 90.0% by weight, component iii) is provided in an amount of 1.0 to 20.0% by weight, and component iv) is provided in an amount of 1.0 to 15.0% by weight, calculated on the sum of components i) to iv).

20 Claims, No Drawings

POLYOLEFIN POLYLACTIC ACID POLYMER BLENDS

The invention relates to a process of preparing a polyolefin polylactic acid polymer blend, to a polyolefin polylactic acid polymer blend, and to a pre-compounded masterbatch composition for use in preparing a polyolefin polylactic acid polymer blend.

Polylactic acid is one of the commercially most relevant renewable resource based polymers. In view of moving towards a more sustainable economy, blends of polylactic acid and polyolefins have gained increased interest. Extended durability, high stiffness and mechanical strength, as well as good ageing performance have been reported for such blends.

The use of maleic anhydride grafted polypropylene to increase the impact resistance of polypropylene polylactic acid blends wherein polypropylene forms the continuous phase has been described (Nalin Polypetchara et. al.; Energie Procedia 56 (2014) 201-210).

US 2010/0160564 describes blends of polypropylene and polylactic acid and further comprising a copolymer of ethylene/methylmethacrylate and an epoxy-functional monomer, such as glycidyl methacrylate, and an elastomer. The copolymers of ethylene and epoxy-functional monomers have limited miscibility with polypropylene.

US 2014/0066565 describes blends of 40 to 80 weight-% polypropylene, 10 to 45 weight-% polylactic acid, and 3 to 30 weight-% of a reactive compatibilizer. The reactive compatibilizer is a graft copolymer of polypropylene with glycidyl methacrylate or an ethylenically unsaturated imide. This invention seeks to provide blends with high heat resistance and balanced mechanical properties. The impact resistance of the blends is on a moderate level.

Grafted polypropylene polymers can be employed as reactive modifiers for polypropylene polylactic acid blends. It has been found that the effectiveness of such modifiers varies with the type of polylactic acid used. Parameters like molecular weight, hydroxyl number and acid number of the polylactic acid are critical factors for success. Blends of polylactic acid and 5 to 50 weight-% of polypropylene with good mechanical properties were only obtained with polylactic acid having a high melt flow rate. If higher molecular weight grades of polylactic acid were employed, the use of a reactive modifier of polypropylene grafted with glycidyl methacrylate did not lead to improved blend properties, sometimes even to deteriorated properties.

The invention seeks to provide polyolefin polylactic acid polymer blends which are easy to prepare and to handle. The polymer blends should exhibit very good mechanical properties.

Such properties should be obtainable irrespective of the selected type of polylactic acid. The invention also seeks to provide improved modifiers for polyolefin polylactic avid blends. To allow a more widespread application of polylactic acid based on renewable resources, the above-mentioned goals should also be obtained for polyolefin polylactic acid blends wherein polylactic acid forms the continuous phase.

The invention provides a process of preparing a polyolefin polylactic acid polymer blend comprising the steps of
i) providing a polyolefin selected from polyethylene, polypropylene, and mixtures and copolymers thereof,
ii) providing polylactic acid,
iii) providing a polyolefin selected from polyethylene, polypropylene, and mixtures and copolymers thereof grafted with at least one epoxide-functional monomer,
iv) providing a polylactic acid grafted with at least one carboxylic acid or carboxylic anhydride functional monomer,
v) mixing the components i) to iv) at elevated temperature in a range from 150° C. to 260° C., and wherein component i) is provided in an amount of 5.0 to 50.0% by weight, component ii) is provided in an amount of 40.0 to 90.0% by weight, component iii) is provided in an amount of 1.0 to 20.0% by weight, and component iv) is provided in an amount of 1.0 to 15.0% by weight, calculated on the sum of components i) to iv).

The process of the invention provides polyolefin polylactic acid polymer blends which are easy to prepare and to handle. The polymer blends obtained according to the process exhibit very good mechanical properties. Such properties are obtainable irrespective of the selected type of polylactic acid. This was also found for polymer blends wherein polylactic acid forms the continuous phase. Hence, the invention allows the more widespread use of renewable resource based polylactic acid.

The skilled reader will understand that components i) and iii), and ii) and iv), respectively, are different from each other. Generally, components i) and ii) relate to a polyolefin or polylactic acid which have not been grafted with reactive functional monomers.

Component i) is a polyolefin selected from polyethylene, polypropylene, and mixtures and copolymers thereof. Examples of suitable types of polypropylene include isotactic, syndiotactic, and atactic homopolymers of propylene. Copolymers of propylene with ethylene are suitable, too. High-, medium- or low density polyethylene can be employed, as well as copolymers of ethylene with varying amounts of propylene. Component i) is generally provided in an amount of 5.0 to 50.0% by weight, preferably at most 40.0% by weight, calculated on the sum of components i) to iv). Otherwise, there are no particular limitations for the selection of component i). In a preferred embodiment, the polyolefin of component i) has a melt flow rate in the range of 0.1 to 100.0 g/10 min at a temperature of 230° C./2.16 kg. The melt flow rate can be determined in accordance with ISO standard 1133.

Component ii) is polylactic acid. It is provided in an amount of 40.0 to 90.0% by weight, calculated on the sum of components i) to iv). Preferably, polylactic acid is provided in an amount that it forms a continuous phase in the polymer blend. This is generally achieved when polylactic acid is provided in a higher weight proportion than the polyolefin. In preferred embodiments, polylactic acid is provided in an amount of at least 50.0% by weight, more preferably at least 60.0% by weight, calculated on the sum of components i) to iv). The advantages of the invention become particularly apparent when polylactic acid having a high molecular weight and/or a low concentration of carboxylic acid end groups is employed. Therefore, it is preferred to use polylactic acid having a melt flow rate in the range of 0.1 to 15.0, more preferably 0.2 to 12.0 g/10 min at 190° C./2.16 kg, determined in accordance with ISO standard 1133 It is also preferred that the polylactic acid has an acid value in the range of 0.01 to 2.00 mg KOH/g.

Component iii) is a polyolefin selected from polyethylene, polypropylene, and mixtures and copolymers thereof grafted with at least one epoxide-functional monomer. Component iii) is provided in an amount of 1.0 to 20.0% by weight, calculated on the sum of components i) to iv). In a preferred embodiment, component iii) contains 0.5 to 6.0% by weight of grafted epoxide-functional monomer, calculated on the weight of component iii). Generally, it is preferred that the main monomer of the polyolefin component iii) is identical to the main monomer of component i). The main monomer is the monomer which is present in the polyolefin in polymerized form in the highest molar proportion.

Preferred types of polypropylene for grafting with epoxide-functional monomers are polypropylene homo-polymers or polypropylene random co-polymers with a low content of ethylene of from 0.1% up to 7.0% by weight. The polypropylene for grafting is preferably provided as a powder. The melt flow rate of the polypropylene before grafting is preferably in the range of 1.0 to 800.0 g/10 min at a temperature of 230° C./2.16 kg.

In case of polyethylene as a base polymer for grafting any polyethylene can be used, preferably as a powder for grafting with epoxy-functional monomers. The melt flow rate of the polyethylene before grafting is preferably in the range of 0.5 to 200.0 g/10 min at a temperature of 190° C./2.16 kg.

Examples of suitable epoxide-functional monomers are ethylenically unsaturated polymerizable monomers having an epoxide-functional group, such as glycidyl acrylate, glycidyl methacrylate, allyl glycidyl ether, 3,4-epoxy-1-butene, and 1,2-epoxy-5-hexene.

If so desired, other polymerizable monomers can be used together with the epoxide-functional monomer in the grafting reaction. Generally, the weight ratio of other polymerizable monomers to epoxide-functional monomer is in the range of 1:6 to 1:2. Examples of suitable other polymerizable monomers are (meth)acrylic acid esters, such as butyl acrylate, and vinyl aromatic compounds, such as styrene.

The grafting step for preparing component iii) is suitably carried out in the presence of radical generating agents, such as organic peroxides and azo compounds. Radical generating agents having a one hour half-life temperature ($T_{H/1h}$) in the range of 55 to 150° C. are preferred. Suitable examples are dialkyl peroxidicarbonates, such as dibutyl peroxidicarbonate and dicetylperoxidicarbonate ($T_{H/1h}$=65° C.); dilaurylperoxide ($T_{H/1h}$=80° C.); dibenzoylperoxide ($T_{H/1h}$=91° C.); tert.-butylperoxy-2-ethyl hexanoate ($T_{H/1h}$=91° C.); tert.-butylperoxy-isobutyrate ($T_{H/1h}$=98° C.); 1,1-di-(tert.-butylperoxy)-cyclohexane ($T_{H/1h}$=113° C.), tert.-butylperbenzoate ($T_{H/1h}$=122° C.); dicumylperoxide ($T_{H/1h}$=132° C.); 2,5-dimethyl-2,5-di(tert.-butylperoxy)-hexane ($T_{H/1h}$=134° C.); 2,5-dimethyl-2,5-di(tert.-butylperoxy)hexin-(3) ($T_{H/1h}$=141° C.); and di-tert.-butylperoxide ($T_{H/1h}$=141° C.).

The grafting step for preparing component iii) is preferably carried out in the solid phase below the softening or melting temperature of the polyolefin. An advantage of the solid phase reaction is the possibility to achieve a very low content of residual monomers, for example 0.001% by weight or less of residual monomer, calculated on the weight of the grafted polyolefin.

Polyolefin grafted with glycidyl methacrylate generally has a content of grafted glycidyl methacrylate in the rage of 0.5 to 5.0% by weight.

The melt flow rate of the grafted polypropylene can vary, depending on the requirements. Generally, the melt flow rate is in the range of 1.0 to 1000.0 g/10 min at 230° C./2.16 kg. A preferred grafted polypropylene has a content of glycidyl methacrylate in the range of 1.0 to 3.0% by weight, calculated on the weight of component iii) and a melt flow rate of 200.0 g/10 min at 230° C./2.16 kg or higher.

Copolymers of propylene and ethylene or polyethylene can be grafted analogously, taking into account the melting range of the polyolefin when selecting the reaction temperature.

Component iv) is a polylactic acid grafted with at least one carboxylic acid or carboxylic anhydride functional monomer. This component is provided in an amount of 1.0 to 15.0% by weight, calculated on the sum of components i) to iv).

There are no particular limitations with respect to the selection of the polylactic acid for grafting. The polylactic acid may be crystalline or partly crystalline.

The polylactic acid for grafting is preferably provided as a powder.

In a preferred embodiment, the polylactic acid used for grafting has a melt flow rate above 10.0 g/10 min at 190° C./2.16 kg.

Examples of suitable carboxylic acid or carboxylic anhydride functional monomers are ethylenically unsaturated polymerizable monomers having an carboxylic acid or carboxylic anhydride functional group, such as acrylic or methacrylic acid, maleic acid, fumaric acid, itaconic acid or itaconic anhydride, and citraconic acid.

In a preferred embodiment, component iv) contains 0.1 to 8.0% by weight of grafted carboxylic acid or anhydride functional monomer, calculated on the weight of component iv).

It is further preferred that component iv) contains up to 5.0% by weight of grafted carboxylic acid or anhydride functional monomer, for example 0.5 to 2.0% by weight, always calculated on the weight of component iv).

The grafting reaction is preferably carried out as described above for component iii) in the solid phase, including the selection of radical generating agents described above. Component iv) preferably has a melt flow rate in the range of 1.0 to 150.0 g/10 min at a temperature of 190° C./2.16 kg.

The process of mixing components i) to iv) is carried out at elevated temperature in the range of 150 to 260° C. Suitable equipment for mixing and blending polymers at elevated temperature known to the skilled person can be used for the process of the invention. In a preferred embodiment, the process of mixing the components is carried out in an extruder.

Generally, the ratio of component iii) to component i) is from 1:6 to 1:1, preferably 1:2 to 1:4.

In some embodiments, components i) to iv) described above are provided as individual components. This already ensures a significant improvement of the mechanical properties of the polyolefin polylactic acid blends. A particular advantage of the process of the invention is that polymer blends with good mechanical properties can be obtained independent of the molecular weight of the polyolefin and polylactic acid to be blended. However, it has been found preferable to provide components iii) and iv) as a pre-compounded masterbatch. When a pre-compounded masterbatch is used, it is preferably provided in an amount of 5.0 to 50.0% by weight, calculated on the sum of components i), ii), and the pre-compounded masterbatch.

The pre-compounded masterbatch is suitably prepared by mixing components iii) and iv) at elevated temperature in the range of from 150 to 260° C. The mixing of components iii) and iv) is preferably carried out in an extruder. However, any other known equipment for mixing or blending polymers at elevated temperature can also be used. It is assumed that at least some reaction of the epoxide groups of component iii) and the carboxylic acid and/or anhydride groups of component iv) occurs during preparation of the pre-compounded masterbatch.

Components iii) and iv) are suitably provided for the pre-compounded masterbatch in a weight ratio of 2:1 to 1:3.

In the pre-compounded masterbatch components iii) and iv) are preferably present as two continuous phases.

The invention also relates to the pre-compounded masterbatch described above, more in particular to a pre-compounded masterbatch composition obtainable by mixing at elevated temperature in the range of from 150 to 260° C.
- a) 25.0 to 66.0% by weight of polypropylene grafted with at least one epoxide-functional monomer, and
- b) 37.0 to 75.0% by weight of polylactic acid grafted with a carboxylic acid or carboxylic anhydride functional monomer, wherein the weight % are calculated on the total weight of a) and b).

In one embodiment, the pre-compounded masterbatch composition comprises 80.0 to 100.0% by weight of components a) and b), calculated on the weight of the composition.

The invention also relates to the use the pre-compounded masterbatch for preparing polyolefin polylactic acid polymer blends, and to a process of preparing polyolefin polylactic acid polymer blends, wherein the pre-compound masterbatch is added as a compatibilizer.

The invention also relates to a polyolefin polylactic acid polymer blend obtainable by mixing at elevated temperature in a range from 150° C. to 260° C.
- i) 5.0 to 50.0% by weight of a polyolefin selected from polyethylene, poly-propylene, and mixtures and copolymers thereof,
- ii) 40.0 to 90.0% by weight of polylactic acid,
- iii) 1.0 to 20.0% by weight of a polyolefin selected from polyethylene, poly-propylene, and mixtures and copolymers thereof grafted with at least one epoxide functional monomer, and
- iv) 1.0 to 15.0% by weight of a polylactic acid grafted with a carboxylic acid or carboxylic anhydride functional monomer, wherein the % by weight are calculated on the sum of components i) to iv).

In a preferred embodiment, component ii) is present in the polymer blend as a continuous phase.

The polymer blends of the invention can comprise further additives and components. These components can be included in usual amounts and depending in the intended use of the polymer blend. Examples of further additives are antioxidants, heat stabilizers, UV stabilizers, processing aids, anti-foaming agents in an amount of 0.01 to 5.00% by weight, calculated on the weight of the entire blend. Further examples of additives include flame retarding agents, colorants, pigments, fillers, and further polymeric or elastomeric components in an amount of 1.0 to 60.0% by weight, calculated on the weight of the entire blend.

The polymer blends are very suitable for processing to form 3-dimensional objects. Known problems caused by polylactic acid, like shrinkage and post crystallization, are significantly reduced with the polymer blends of the invention. Processing can be carried out in usual equipment, for example in twin-screw extruders or by injection molding. Processing temperatures are usually above 200° C., preferably above 220° C. The upper limit of the processing temperature is governed by the decomposition temperature of the components.

Usually, processing above 280° C. is avoided.

EXAMPLES

Synthesis Example 1: Polypropylene Grafted with an Epoxide-Functional Monomer (Component iii)

100 parts by weight of a polypropylene homopolymer powder with an average particle size of 1.5 mm, a weight average molecular weight Mw of 460000 g/mol, a melt flow rate of 10.5 g/10 min (230° C./10 kg), and a melting temperature of 162° C., were placed in a reactor with stirrer. 4 parts by weight of glycidyl methacrylate (GMA) and 0.3 parts by weight of 2,5-dimethyl-2,5-di(tert.-butylperoxy)-hexane were added and the reactor was purged with nitrogen to remove oxygen. The mixture was stirred for a period of 20 minutes at 60° C. Subsequently, the temperature was increased to 146° C. at a heating rate of 1.9° C./min and held at 146° C. for a period of 1 hour, while stirred at 800 rotations/minute. Next, the reactor was purged with nitrogen for one hour. The nitrogen flow rate was 40 parts by volume of nitrogen per reactor volume per hour. After further cooling to 50° C., the reaction product was removed from the reactor.

Synthesis Example 2: Polylactic Acid Grafted with Maleic Anhydride (Component iv)

100 parts by weight of a polylactic acid powder having a melt flow rate of 38 g/10 min (190° C./2.16 kg) were placed in a reactor with stirrer. 2.5 parts by weight of maleic anhydride (MA), 1.0 parts by weight of styrene, and 1.5 parts by weight of dilauryl peroxide were added and the reactor was purged with nitrogen to remove oxygen. The mixture was stirred for a period of 20 minutes at 60° C. Subsequently, the temperature was increased to 105° C. at a heating rate of 1.9° C./min and held at 105° C. for a period of 1 hour, while stirred at 800 rotations/minute. Next, the reactor was purged with nitrogen for one hour. The nitrogen flow rate was 40 parts by volume of nitrogen per reactor volume per hour. After further cooling to 50° C., the reaction product was removed from the reactor.

Synthesis Example 3: Polylactic Acid Grafted with Maleic Anhydride (Component iv)

The procedure was similar to synthesis Example 2. However, the starting material was polylactic acid powder having a melt flow rate of 4.5 g/10 min at 190° C./2.16 kg.

Synthesis Example 4: Polylactic Acid Grafted with Acrylic Acid (Component iv)

The procedure was similar to synthesis Example 3. However, the grafting monomer was acrylic acid (AA) in an amount of 4 parts by weight.

Synthesis Example 5: Polyethylene Grafted with an Epoxide-Functional Monomer (Component iii)

The procedure was similar to synthesis Example 1. However, the grafting was carried out on 100 parts by weight of a high density polyethylene (HDPE) powder with an average particle size of 0.5 mm, a melt flow rate of 19 g/10 min (190° C./2.16 kg), and a melting temperature of 136° C. The polymer was grafted with 3.5 parts by weight of glycidyl methacrylate and 0.5 parts by weight of dilauroylperoxide. The grafting reaction temperature was 100° C. for 45 minutes.

Table 1 summarizes the preparation of grafted polymers:

| Prep. Example | graft monomer | MFR 190° C., 2.16 kg | grafted reactive monomer content in weight - % |
|---|---|---|---|
| 1 | GMA | 84 g/10 min | 2.3 |
| 2 | MA | 26 g/10 min | 1.3 |

-continued

| Prep. Example | graft monomer | MFR 190° C., 2.16 kg | grafted reactive monomer content in weight - % |
|---|---|---|---|
| 3 | MA | 3.7 g/10 min | 1.5 |
| 4 | AA | 3.7 g/10 min | 3.2 |
| 5 | GMA | 16 g/10 min | 2.7 |

Preparation of Pre-Compounded Masterbatches

The pre-compounded masterbatches were prepared in a ZSK 25 Werner & Pfleiderer twin-screw extruder. The components were fed via dosing balances into the intake of the extruder with the following settings:
Temperature in the Extruder

| temperature zone | 1 | 2 | 3 | 4 | 5 | 6 | 7 | 8 |
|---|---|---|---|---|---|---|---|---|
| temperature ° C. | 140 | 180 | 220 | 230 | 230 | 230 | 230 | 220 | number of revolutions 300 rpm
throughput 20 kg/h
strand pelletizing

Table 2 summarizes the preparation of pre-compounded masterbatches of Examples 6 to 9. The table provides the parts by weight of starting materials for pre-compounded masterbatches. Example 6 is a comparative Example.

TABLE 2

| Example | Synth Ex. 1 | PLA* | Synth Ex. 3 | Synth Ex. 4 | Synth Ex 5 |
|---|---|---|---|---|---|
| 6* | 67 | 33 | | | |
| 7 | 67 | | 33 | | |
| 8 | 50 | | | 50 | |
| 9 | | | 33 | | 67 |

*Comparative Example with unmodified polylactic acid

Preparation of Polymer Blends

The polymer blends were prepared as described above for the pre-compounded masterbatches. Table 3 summarizes the preparation of polymer blends of polypropylene and polylactic acid. The table provides the parts by weight of starting materials for polymer blends. Examples 10 to 12 are comparative Examples.

TABLE 3

| | component | | | | Pre-compounded masterbatch | | |
|---|---|---|---|---|---|---|---|
| | ii | | iii | iv | | | |
| Example | Ingeo 2003 | Ingeo 3251 | i PP | Synth Ex. 1 | Synth Ex. 3 | 6 | 7 | 8 |
| 10 | 70 | 0 | 20 | 10 | 0 | 0 | 0 | 0 |
| 11 | 0 | 70 | 30 | 0 | 0 | 0 | 0 | 0 |
| 12 | 65 | 0 | 20 | 0 | 0 | 15 | 0 | 0 |
| 13 | 65 | 0 | 20 | 10 | 5 | 0 | 0 | 0 |
| 14 | 65 | 0 | 20 | 0 | 0 | 0 | 0 | 15 |
| 15 | 0 | 65 | 20 | 10 | 5 | 0 | 0 | 0 |
| 16 | 0 | 65 | 20 | 0 | 0 | 0 | 15 | 0 |
| 17 | 0 | 65 | 20 | 0 | 0 | 0 | 15 | 0 |

Table 4 summarizes the preparation of polymer blends of polyethylene and polylactic acid. The table provides the parts by weight of starting materials for polymer blends. Examples 18 and 19 are comparative Examples. Ingeo 2003 and Ingeo 3251 are commercial polylactic acid grades available from NatureWorks LLC

| | component | | | | Pre-compounded masterbatch 9 |
|---|---|---|---|---|---|
| | ii Ingeo 3251 | i PE | iii Synth Ex. 5 | iv Synth Ex. 3 | |
| Example | | | | | |
| 18 | 70 | 30 | 0 | 0 | 0 |
| 19 | 70 | 20 | 10 | 0 | 0 |
| 20 | 65 | 20 | 10 | 5 | 0 |
| 21 | 65 | 20 | 0 | 0 | 15 |

Table 5 summarizes the test results of mechanical properties of polymer blends. The properties measured on test specimen having dimensions of 80×10×4 mm, prepared by injection molding.

TABLE 5

| Example | MVR (190° C., 2.16 kg) | Flexural Modulus in Mpa ISO 178 2 mm/min | Flexural Strength in MPa ISO 178 2 mm/min | Charpy Impact Strength in kJ/m$^2$ ISO 179/ 1U, 23° C. |
|---|---|---|---|---|
| 10 | 0.5 ml/10 min | 2090 | 39.1 | 5.0 |
| 11 | 22.2 ml/10 min | 2660 | 53.6 | 8.1 |
| 12 | 1.2 ml/10 min | 2320 | 51.5 | 6.9 |
| 13 | 3.5 ml/10 min | 2520 | 69.9 | 14.8 |
| 14 | 4.2 ml/10 min | 2390 | 70.0 | 17.2 |
| 15 | 17 ml/10 min | 2480 | 73.5 | 21.1 |
| 16 | 18 ml/10 min | 2520 | 76.4 | 22.6 |
| 17 | 5.0 ml/10 min | 2380 | 68.6 | 18.5 |
| 18 | 18.8 ml/10 min | 1900 | 41.2 | 4.3 |
| 19 | 2.1 ml/10 min | 2140 | 61.5 | 15.1 |
| 20 | 4.3 ml/10 min | 2220 | 63.2 | 16.5 |
| 21 | 8.2 ml 10/min | 2110 | 68.2 | 18.7 |

The Examples demonstrate the beneficial effects of the invention. The blends of polypropylene and polylactic acid 13 to 17 all exhibit better mechanical properties than comparative compositions 10 to 12. The same conclusion can be drawn for polyethylene polylactic acid blends. The inventive blends 20 and 21 have higher flexural strength and impact strength than their comparative blends 18 and 19.

The results of Examples 14, 16, 17, and 21 demonstrate a good effect of using the pre-compounded masterbatches.

The invention claimed is:
1. A process of preparing a polyolefin polylactic acid polymer blend comprising:
  providing a polyolefin selected from polyethylene, polypropylene, and mixtures and copolymers thereof,
  providing a polylactic acid,
  providing a grafted polyolefin including a polyolefin selected from polyethylene, polypropylene, and mixtures and copolymers thereof grafted with at least one epoxide-functional monomer,
  providing a grafted polylactic acid including a polylactic acid grafted with at least one selected from a carboxylic acid functional monomer and a carboxylic anhydride functional monomer,
  mixing the polyolefin, the polylactic acid, the grafted polyolefin, and the grafted polylactic acid at elevated temperature in a range from 150° C. to 260° C., and wherein the polyolefin is provided in an amount of 5.0 to 50.0% by weight, the polylactic acid is provided in an amount of 40.0 to 90.0% by weight, the grafted polyolefin is provided in an amount of 1.0 to 20.0% by weight, and the grafted polylactic acid is provided in an amount of 1.0 to 15.0% by weight, calculated on the sum of the polyolefin, the polylactic acid, the grafted polyolefin, and the grafted polylactic acid.

2. The process according to claim 1, wherein the mixing is carried out in an extruder.

3. The process according to claim 1, wherein the grafted polyolefin and the grafted polylactic acid are provided as a pre-compounded masterbatch.

4. The process according to claim 3, wherein the grafted polyolefin and the grafted polylactic acid are provided for the pre-compounded masterbatch in a weight ratio of 2:1 to 1:3.

5. The process according to claim 4, wherein the pre-compounded masterbatch is provided in an amount of 5.0 to 20.0% by weight, calculated on the sum of the polyolefin, the polylactic acid, and the pre-compounded masterbatch.

6. The process according to claim 1, wherein the polyolefin has a melt flow rate in the range of 0.1 to 100.0 g/10 min at a temperature of 230° C./2.16 kg, determined in accordance with ISO standard 1133.

7. The process according to claim 1, wherein the grafted polyolefin contains 0.5 to 6.0% by weight of grafted epoxide-functional monomer, calculated on the weight of the grafted polyolefin.

8. The process according to claim 1, wherein the polylactic acid has a melt flow rate in the range of 0.1 to 15.0 g/10 min at a temperature of 190° C./2.16 kg, determined in accordance with ISO standard 1133.

9. The process according to claim 3, wherein the pre-compounded masterbatch is prepared by mixing the grafted polyolefin and the grafted polylactic acid at elevated temperature in a range from 150° C. to 260° C.

10. The process according to claim 1, wherein one or both the grafted polyolefin and the grafted polylactic acid are prepared by solid phase grafting.

11. A pre-compounded masterbatch composition obtainable by mixing at elevated temperature in the range of from 150 to 260° C.
- 25.0 to 66.0% by weight of a grafted polypropylene including polypropylene grafted with at least one epoxide-functional monomer, and
- 37.0 to 75.0% by weight of a grafted polylactic acid including polylactic acid grafted with at least one selected from a carboxylic acid functional monomer and a carboxylic anhydride functional monomer,
- wherein the weight % are calculated on the total weight of the grafted polypropylene and the grafted polylactic acid.

12. The composition according to claim 11, wherein the grafted polypropylene includes polypropylene grafted with glycidyl methacrylate in an amount in the range of 1.0 to 3.0% by weight, calculated on the weight of the grafted polypropylene.

13. The composition according to claim 11, wherein the grafted polylactic acid incudes 0.1 to 8.0% by weight of the grafted at least one selected from a carboxylic acid functional monomer and a carboxylic anhydride functional monomer, calculated on the weight of the grafted polylactic acid.

14. The composition according to claim 11, wherein the grafted polypropylene and the grafted polylactic acid are present as two continuous phases.

15. The composition according to claim 11, wherein the composition comprises 80.0 to 100.0% by weight of the grafted polypropylene and the grafted polylactic acid, calculated on the weight of the composition.

16. A polyolefin polylactic acid polymer blend obtainable by mixing at elevated temperature in a range from 150° C. to 260° C.:
- 5.0 to 50.0% by weight of a polyolefin selected from polyethylene, polypropylene, and mixtures and copolymers thereof,
- 40.0 to 90.0% by weight of a polylactic acid,
- 1.0 to 20.0% by weight of a grafted polyolefin including a polyolefin selected from polyethylene, polypropylene, and mixtures and copolymers thereof grafted with at least one epoxide-functional monomer, and
- 1.0 to 15.0% by weight of a grafted polylactic acid including a polylactic acid grafted with at least one selected from a carboxylic acid functional monomer and a carboxylic anhydride functional monomer,
- wherein the % by weight are calculated on the sum of the polyolefin, the polylactic acid, the grafted polyolefin, and the grafted polylactic acid.

17. The polymer blend according to claim 16, wherein the polylactic acid forms a continuous phase.

18. The polymer blend according to claim 16, wherein the polymer blend is present as a 3-dimensional shaped object obtained by injection molding or extrusion.

19. A process of preparing a polyolefin polylactic acid polymer blend, the process comprising combining the masterbatch composition of claim 11 with a polylactic acid and a polyolefin selected from polyethylene, polypropylene, and mixtures and copolymers thereof.

20. The process according to claim 9, wherein the pre-compounded masterbatch is prepared by mixing the grafted polyolefin and the grafted polylactic acid in an extruder.

* * * * *